July 4, 1933.                O. E. NEWBAUER                1,916,890
                    EMERGENCY KEY HOLDER FOR AUTOMOBILES
                           Filed Dec. 29, 1932
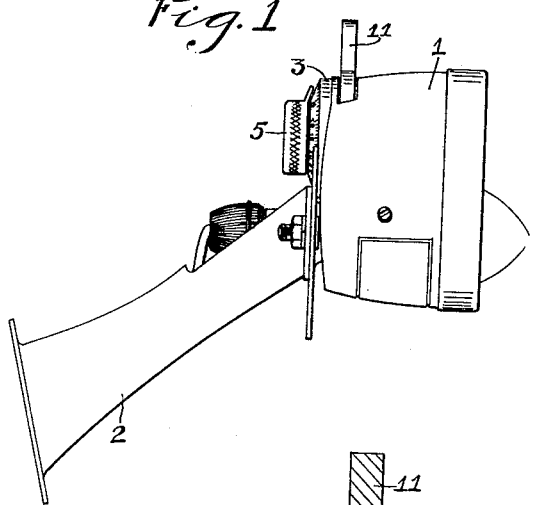
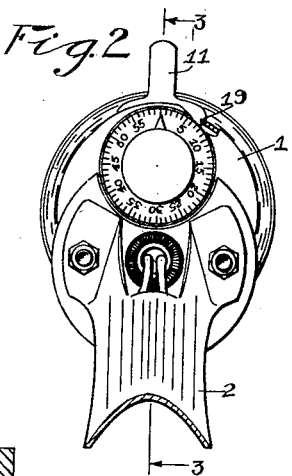
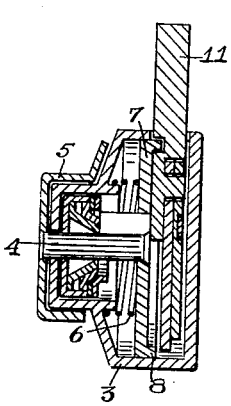
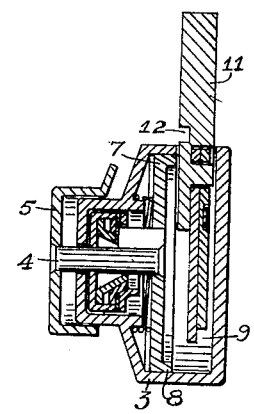
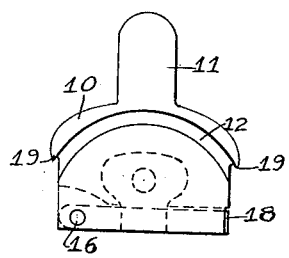
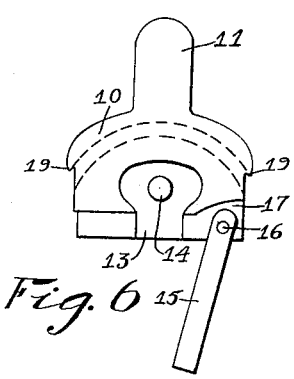
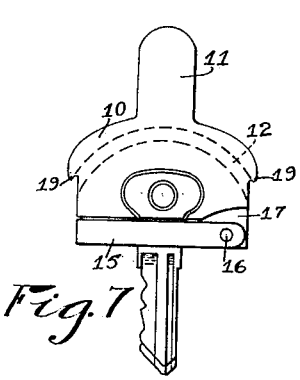
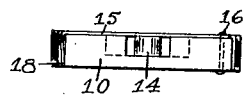
INVENTOR
Oscar E. Newbauer
BY
Harold E. Stonebraker,
ATTORNEY Patented July 4, 1933

1,916,890

UNITED STATES PATENT OFFICE

OSCAR E. NEWBAUER, OF ROCHESTER, NEW YORK

EMERGENCY KEY HOLDER FOR AUTOMOBILES

Application filed December 29, 1932. Serial No. 649,362.

My invention relates to an emergency key holder for automobiles, and has for its object to provide an additional key or set of keys housed in some exterior part of an automobile and available in case the operator loses the regular keys.

In the course of the operation of an automobile, the ignition key is sometimes lost or the key which locks the transmission or the door to the body may be lost so that the operator is unable to gain access to or start the car, and under such conditions it is desirable to have an additional set of keys which may be had and which are always located on the car.

A further object of the invention is to so house an extra set of keys that they can only be released upon operating a permutation lock by some one knowing the combination and cannot be removed by an unauthorized person.

To these and other ends, the invention comprises the combination and arrangement of parts that will appear clearly from the following description when read in conjunction with the accompanying drawing, the novel features being pointed out in the claims following the specification.

In the drawing:

Fig. 1 is a side elevation showing one application of the invention;

Fig. 2 is a front elevation of the same;

Fig. 3 is a sectional view on line 3—3 of Fig. 2 showing the key carrier in locked position;

Fig. 4 is a similar sectional view showing the key carrier released and partially removed;

Fig. 5 is a front elevation of the key carrier;

Fig. 6 is a rear elevation of the key carrier with the key retainer in its open position;

Fig. 7 is a similar view showing the key retainer closed and holding the keys on the carrier, and Fig. 8 is an end elevation of the key carrier.

The purpose of the invention may be accomplished in a variety of ways and the device may be arranged at any convenient point of an automobile, but for illustrative purposes I have shown it in conjunction with a conventional type of tail lamp the casing of which is indicated generally at 1, mounted on a bracket 2 which is attachable to some part of an automobile. The parts comprising the invention are secured within the body 1 of the tail lamp in any suitable way and include a barrel 3 fixedly mounted inside the casing 1 of the lamp and slotted on its upper side, the casing 1 being similarly slotted to receive the key carrier that will be described more in detail presently.

The barrel 3 contains an endwise movable bolt 4 to which is fixed a cap 5 that is rotatable according to a prearranged combination to bring the tumblers into proper position to release the bolt 4 and permit it to be drawn outwardly against the action of the spring 6 from the locking position shown in Fig. 3 to the releasing position shown in Fig. 4.

The details of the permutation lock form no part of my invention and may be of conventional form or of the type illustrated in Patent No. 1,666,078, dated April 17, 1928. The bolt 4 has fixed thereto a locking member comprising the plate 7 with an annular flange 8 that engages the key carrier and holds it within the barrel.

The barrel is provided with a recess 9 to receive the key carrier and keys which can be inserted when the locking member is withdrawn to the position shown in Fig. 4. The key carrier comprises a body portion designated generally at 10 which extends inside the barrel and an upstanding handle portion 11 that projects upwardly from the barrel. On one side of the body portion 10 is an arcuate groove or recess 12 to receive the locking flange 8 while the opposite side of the body portion is provided with suitable key retaining means.

In the illustrated embodiment, the body is recessed on the opposite side at 13 to receive the finger portion of the key, 14 being a post upon which the key may be mounted by means of the opening usually found in the finger portion of a key of this type. In the structure shown, the post 14 and the recess 13 are arranged to carry two keys, these being held in position on the carrier by retaining means which may consist of a spring member 15 pivoted at 16 on an undercut shoulder 17. The spring member 15 has a depending lug 18 at its free end which engages against the adjacent surface of the carrier when swung to its retaining position and acts frictionally to hold the keys in position on the carrier. 19 are lugs on the key carrier arranged to engage the outside of the barrel and limit downward movement of the key carrier when it is inserted in the barrel.

In the operation of the device, assuming the carrier is removed from the barrel and the spring retainer is open, keys are positioned in the recess 13 over the post 14 and the spring retainer 15 is then swung to the position shown in Fig. 7. Then upon withdrawing the cap 5 against the action of spring 6 until it assumes the position shown in Fig. 4 with the locking member withdrawn from the recess, the key carrier can be inserted with the keys extending downwardly through the opening in the top of the casing 1 and in the top of the barrel 3. Upon releasing the cap 5, the locking flange 8 engages the groove 12 in the key carrier to hold the latter securely within the barrel against accidental or unauthorized removal, after the cap 5 and bolt 4 are turned to disarrange the tumblers and prevent outward movement of the bolt 4. The key carrier remains securely locked within the barrel in the position shown in Fig. 3 and cannot be removed until the cap 5 is turned in accordance with a prearranged combination to set the tumblers and release the bolt for outward movement. Then upon drawing the latter outwardly against the action of spring 6 in the manner shown in Fig. 4, the key carrier is released and can be removed to make the emergency keys available.

While the invention has been described with reference to a particular structural embodiment, it is not confined to use on an automobile or to the details herein disclosed, and the application is intended to cover any other adaptations, modifications or departures coming within the purposes of the improvements or the scope of the following claims.

I claim:

1. The combination with a barrel having a recess and a permutation locking member movable into said recess, of a key carrier positionable in said recess and adapted to be retained by said locking member, said key carrier being removable from the recess and including a key holding portion entirely housed within the barrel when locked.

2. The combination with a barrel having a recess and a permutation locking member movable into said recess, of a key carrier positionable in said recess and adapted to be retained by said locking member, said key carrier being removable from the recess and including a key holding portion entirely housed within the barrel when locked, and a handle portion projecting outside the barrel.

3. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and means on the other side to retain a key.

4. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and a key receiving recess on its opposite side.

5. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and a recess on its opposite side to receive the handle of a key, and means for retaining the key in the recess.

6. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and a recess on its opposite side to receive the handle of a key, and a locking member pivoted to the carrier and movable to a position over the key so as to retain it in said recess.

7. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and means on the other side to retain a key, said body portion and key being housed within the barrel when locked.

8. The combination with a barrel having a recess and a permutation locking member movable into said recess, of a key carrier positionable in said recess and adapted to be retained by said locking member, said key carrier being removable from the recess and including a body portion and an upstanding handle portion, the body portion having a groove on one side to receive the locking member and a recess on its opposite side to receive the handle of a key, and a locking member pivoted to the carrier and movable to a position over the key so as to retain it in said recess, said body portion and key being housed within the barrel when locked.

9. The combination with a barrel having a recess and a permutation locking member movable into said recess, of a key carrier positionable in said recess and adapted to be retained by said locking member, and means for removably holding a key on the carrier.

10. The combination with a barrel having a recess and a permutation locking member movable into said recess, of a key carrier positionable in said recess and adapted to be retained by said locking member, said key carrier being removable from the recess and including a key holding portion entirely housed within the barrel when locked, and means for removably holding a key on the carrier.

In witness whereof, I have hereunto signed my name.

OSCAR E. NEWBAUER.